Figure 1:
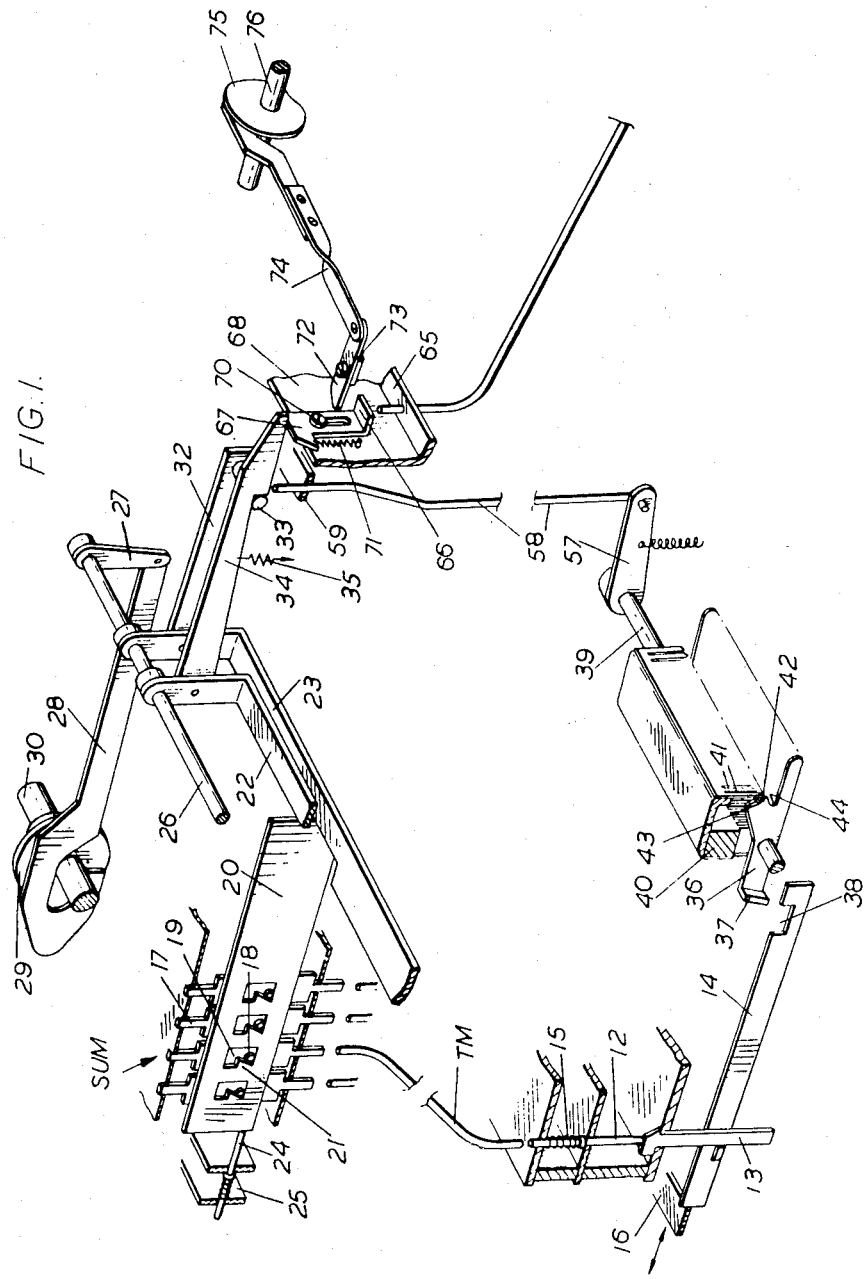

Dec. 20, 1955 R. R. EDEN 2,727,684
CALCULATING MACHINES CONTROLLED BY STATISTICAL RECORD CARDS
Filed March 23, 1953 2 Sheets-Sheet 1

INVENTOR
REGINALD R. EDEN
BY
ATTORNEY

Dec. 20, 1955   R. R. EDEN   2,727,684
CALCULATING MACHINES CONTROLLED BY STATISTICAL RECORD CARDS
Filed March 23, 1953   2 Sheets-Sheet 2
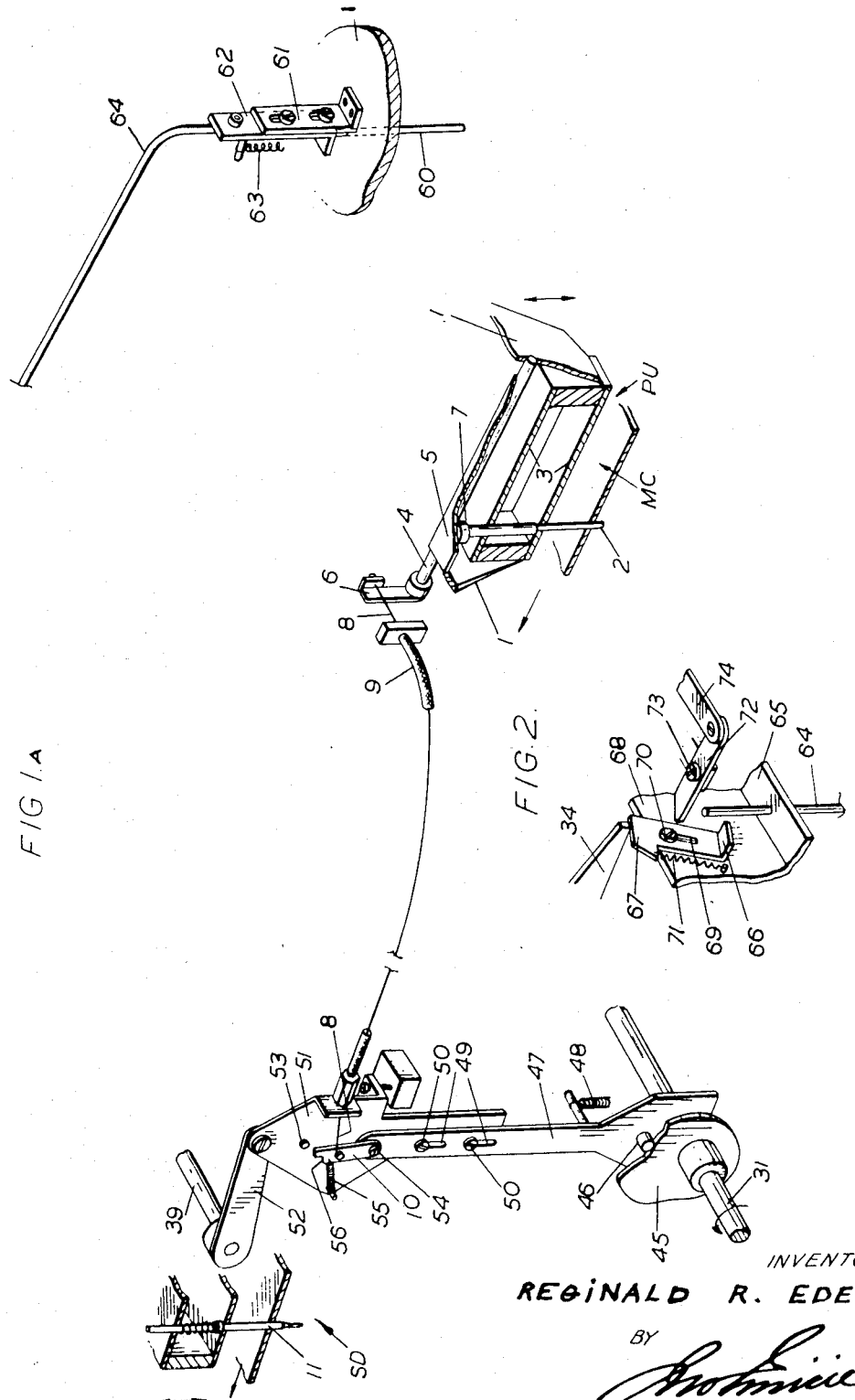
INVENTOR
REGINALD R. EDEN
BY
ATTORNEY United States Patent Office 2,727,684
Patented Dec. 20, 1955

2,727,684

CALCULATING MACHINES CONTROLLED BY STATISTICAL RECORD CARDS

Reginald Raymond Eden, Thornton Heath, England, assignor to Powers-Samas Accounting Machines Limited, London, England, a British company Application March 23, 1953, Serial No. 343,986

Claims priority, application Great Britain October 15, 1952

17 Claims. (Cl. 235—61.6)

This invention relates to calculating machines controlled by statistical record cards.

In a calculating machine controlled by record cards a calculation such as the multiplication or division of one amount by another is effected by the machine after the two factors from which the calculation is to be performed have been sensed from a record card or cards and entered into the machine. Sometimes, however, it is desired to perform a series of successive calculations for which one of the two factors is common to the series.

It is a main object of the present invention to provide apparatus whereby a factor which is to be common to a series of successive calculations can be sensed from a master card fed to the machine in precedence of a series of detail cards containing the others of the two factors for the series of calculations, the common factor being stored for use as each second factor is sensed from a detail card.

According to the present invention there is provided in a calculating machine controlled by statistical record cards, apparatus for entering into the machine two factors from which a calculation is to be performed, said apparatus comprising sensing means to sense one factor from each of two card fields, set-up means including set-up members to receive and retain a factor sensed from each of said card fields, transmission means for each said card field to transmit to the set-up means factors sensed by the sensing means, and a pre-sensing unit to sense a card prior to sensing thereof by said sensing means and operating under card control to permit a factor sensed from one card field to be stored in the set-up means until eliminated therefrom under control of the pre-sensing means and to render ineffective the transmission means for said one card field while said factor remains stored in the set-up means.

In order that the invention may be clearly understood one embodiment thereof will now be described, by way of example, with reference to the accompanying diagrammatic drawings in which:

Figures 1 and 1A juxtaposed one above the other form is a diagrammatic pictorial illustration of an apparatus according to the invention, and Figure 2 is a pictorial view illustrating some of the parts shown in Figure 1 occupying positions different from those which they occupy in Figure 1.

In the apparatus about to be described, it is assumed that the machine to which the apparatus according to the invention is applied is a calculating machine which is to perform multiplication operations from two factors comprising a multiplicand and a multiplier. When the machine is to perform calculations using a multiplicand which is common to a series of caculations to be performed in succession by the machine, the multiplicand is recorded on a master card and the multiplier for each calculation is recorded on cards referred to herein as detail cards. The master card is fed into the machine in precedence to the series of detail cards which are to be employed in conjunction therewith.

In the subsequent description the record cards will be referred to as punched or perforated cards although, as will be readily understood by those skilled in the art, data may be recorded on record cards by means other than perforations and it will therefore be readily understood that the apparatus about to be described can, if desired, be modified to accommodate record cards having data recorded thereon by means other than perforations.

Referring to the drawings, record cards are fed in succession from a magazine, not shown, first to a pre-sensing unit PU which determines whether the card fed thereto is a master card containing a multiplicand common to a succession of detail cards to follow it or whether the card fed thereto is a detail card containing a multiplier to be employed with a common multiplicand sensed from a preceding master card. The cards are fed from the pre-sensing unit to a sensing device SD which is of well-known construction and which operates to sense from the cards fed thereto the multiplicand or the multiplier if master and detail cards are being employed, or which operates to sense both the multiplicand and the multiplier should the machine be conditioned to receive those two factors simultaneously from the sensing of a single card. The factors sensed by the sensing device SD are transmitted thereby through transmission members TM contained in a connection box in well-known manner to a set-up means SUM co-operating with electrical contacts, not shown, whereby the factors sensed from the record card are entered electrically into the calculating machine.

The pre-sensing unit PU comprises frames 1 reciprocable in a vertical direction by any suitable means, not shown, and supporting a pre-sensing pin 2 which is freely movable in an axial direction in plates 3 carried by the frames 1. Pivotally mounted in the frames 1 is a spindle 4 to which is secured a plate 5 and an arm 6. The plate 5 is disposed over the head 7 of the pre-sensing pin 2 for engagement thereby, the arrangement being such that when the pre-sensing pin passes through a control hole formed in a predetermined position in a master card MC no rocking movement of spindle 4 is effected. If, however, the card sensed by the pre-sensing unit is a detail card, on downward movement of the pre-sensing unit, movement of the pre-sensing pin 2 will be arrested by the card so that there is relative movement between the pin and the frames 1. The head 7 of the pin thus engages the plate 5 and rocks the spindle 4 and arm 6 in a clockwise direction as viewed in Figure 1. To the arm 6 is secured the inner wire 8 of a flexible wire 9, such as a Bowden wire, the other end of the inner wire 8 being secured to a latch piece 10 which accordingly is conditioned by the pre-sensing pin 2 for operation as described below.

The sensing device SD is similar to that described in British specification No. 401,012 and operates in the manner described therein, it is therefore not necessary to describe in detail the operation of this well-known device which has become known in the art as a "locked pin box." Briefly, the sensing device comprises sensing pins 11, transmission pins 12, and intermediate pins 13, hereinafter referred to as hatchet pins, and the hatchet pins together with the transmission pins and the transmission members TM form transmission means by which factors sensed from cards by the sensing pins 11 are set-up in the set-up means SUM.

The sensing device differs, however, from that described in the aforesaid prior specification No. 401,012 in that the slotted plate referred to in the prior specification is replaced by control slides 14, one slide 14 being provided for each column of hatchet pins 13. The function of the slides 14 is, however, the same as that of the slotted plate described in the aforesaid prior specification in that movement of the slides, to the left as viewed in Figure 1, permits the transmission pins 12 under the action of their springs 15 to rock the hatchet pins 13 so that they can be aligned with the transmission pins and sensing pins, as diagrammatically indicated in Figure 1, to effect lengthwise movement of transmission members TM. It will, of course, be understood that in Figure 1 there is illustrated only part of one column of the sensing device and set-up means and that, for clarity only one sensing pin 11, one hatchet pin 13, one transmission pin 12, and one transmission member TM for such one column are illustrated.

The controlling slides 14 are restored by a restoring bar 16, common thereto and movement of the slides 14, to the left as viewed in Figure 1, after withdrawal of the restoring bar 16 is effected by pusher pins and springs, not shown, but which are similar to those described below with reference to the set-up means SUM.

The set-up means is a unit known in the art as a set bar unit and consists of columns of set bars 17, one for each column of sensing pins 11 in the card fields to be sensed, each column of set bars comprising a set bar for each sensing pin 11 of the column of sensing pins. The construction of the set-up means is well understood in the art but briefly each set bar 17 has secured thereto a pin 18 which is located in a window 19 formed in a locking slide 20. In the inactive position of the set bars 17, a pin 18 is the position indicated in Figure 1 in which position it is located below a projection 21 extending into the window 19. When the set bar is raised to its active position it is locked in the active position by reason of the pin 18 being located on the top of the projection 21 due to the locking slide 20 having been moved to the right as viewed in Figure 1. To restore the locking slides 20 to the inactive position thereof, in order to eliminate factors set-up in the set bar unit, the slides are moved to the left, as viewed in Figure 1, by one or other of two factor eliminators referred to herein as a first factor eliminator 22 and a second factor eliminator 23. On movement of the factor eliminators to the right, as viewed in Figure 1, pusher pins 24, under the action of springs 25 in known manner, cause the locking slides 20 to be moved to the right, as viewed in Figure 1, so that any set bars 17 which have been raised to the active positions thereof by transmission members TM are locked in their active positions. The set bars remain in their locked condition until the locking slides 20 are moved to the left, as viewed in Figure 1, by the appropriate factor eliminator 22 or 23.

The factor eliminator 22 is secured to a rocking spindle 26 to one end of which there is secured an arm 27 connected to a link 28 carrying a cam follower, not shown, co-operating with a cam 29 on a shaft 30 driven from the main shaft 31 by any suitable means not shown. The second factor eliminator 23 is freely mounted on the spindle 26 and has fixed thereto an arm 32 from which projects a latching pin 33. Pivoted to the first factor eliminator 22 is an eliminator latch 34 urged downwards by a spring 35 so that the factor eliminator 23 is normally coupled to the factor eliminator 22 for simultaneous movement therewith under control of cam 29.

When the two factor eliminators 22, 23 are coupled for simultaneous movement they operate to eliminate from the set-up means SUM both factors which are set-up therein but when the set-up means has set therein a multiplicand which is common to a number of successive calculating operations, the eliminator latch 34 is tripped out of engagement with the latch pin 33 so that on operation of cam 29 only the eliminator 22 is operated thereby actuating only the locking slides 20 for the multiplier field of the set-up means SUM thus preparing the set-up means to receive a new multiplier for use with the multiplicand which remains stored in the set-up means.

Operation of the eliminator latch 34 is controlled by the pre-sensing unit PU through the pre-sensing pin 2 and inner wire 8 above mentioned. To this end the sensing device SD incorporates a plurality of manually settable sensing latches 36, one for each card column of the multiplicand field, each having an overturned portion 37 for engagement in a slot 38 formed in the control slide 14 with which it is to co-operate. The sensing latches 36 are freely pivoted on a rock shaft 39 and are guided by a fixed comb bar 40. Secured to the bar 40 is a plate having tongues 41 the free ends of which are curled and inturned to provide detent members 42 each of which is engaged by a groove 43 in the sensing latch 36, as indicated in Figure 1, when the sensing latch is disposed in its inactive position. When the sensing latches are in their inactive position the machine is conditioned so that the sensing device can sense a multiplicand and a multiplier both of which are punched in a single card. When, however, the machine is to be conditioned to operate so that multiplicands are sensed from master cards and stored in the set-up means SUM, the sensing latches 36 are conditioned by the machine operator who moves the sensing latches counter-clockwise, as viewed in Figure 1, so that the groove 43 is moved out of engagement with its detent member 42 and a second groove 44 engages the member 42. When so set the sensing latches 36 are in their active positions, and on movement of the rock shaft 39, counter-clockwise as viewed in Figure 1, the overturned portions 37 of the sensing latches are moved into the slots 38 of control slides 14, thus preventing lengthwise movement of the control slides and so by preventing the hatchet pins 13 controlled thereby from being rocked to the vertical position thereof, rendering ineffective the transmission means for the multiplicand field. Accordingly, when the multiplicand transmission means are rendered ineffective although the sensing pins 11 may sense data punched in the multiplicand field of the card such data is not transmitted to the set-up means SUM.

Operation of the rock shaft 39 is effected by actuator means comprising a cam 45 secured to the main shaft 31 and co-operating with a cam follower 46 carried by a link 47 urged towards the cam by a spring 48. The link 47 is provided with slots 49 to permit the link to slide on pins 50 carried by a plate 51 which together with the latch piece 10 comprises a trip latch whereby connection between the rock shaft 39 and the cam 45 is effected. The plate 51 is connected to an arm 52 secured to the rock shaft 39 and from the plate 51 extends an abutment 53 for co-operation with the latch piece 10.

The latch piece 10 is pivoted at 54 to the link 47 and is urged in a counter-clockwise direction, as viewed in Figure 1, by a spring 55. Normally the latch piece 10 occupies an inactive position, as shown in Figure 1, whereby when the link 47 is raised by cam 45 the latch piece is not engaged with the abutment 53. The timing of the cam 45 is such that when the pre-sensing unit PU is operative to sense a record card the cam follower 46 is in the position shown in Figure 1. Thus if a detail card is presented to the pre-sensing unit the pre-sensing pin 2 effects rocking of spindle 4, the latch piece 10 is moved by the inner wire 8, clockwise as viewed in Figure 1, to a position at which a step 56 on the latch piece is located beneath the abutment 53. As the cam 45 continues its rotation the link 47 is raised thereby and moves the step 56 into engagement with the abutment 53 and the plate 51 is raised, thus rocking shaft 39 and moving the out-turned portions 37 on sensing latches 36 into the slots 38 of the control slides 14 to render the slides inoperative. The rocking movement of rock shaft 39 also through an arm 57, shaft 39 and a link 58 guided for lengthwise movement by a plate 59, trips the eliminator latch 34 to uncouple the second factor eliminator 23 from the first factor eliminator 22. Thus when the detail card sensed by the pre-sensing unit PU is sensed by the sensing device S the multiplicand section of the sensing device is rendered ineffective and the second factor eliminator 23 is also rendered ineffective so that when cam 29 rocks spindle 26 only the first factor eliminator 22 is operated to eliminate the set-up multiplier from the set-up means SUM, the multiplicand already set up in the set-up means remaining stored by the set-up means ready for the next operation.

From the foregoing it will be understood that when the apparatus is conditioned to operate, as herein described, under control of master and detail cards a multiplicand set up in the set-up means as the result of being sensed from a master card will remain stored in the set-up means until the next master card is sensed by the pre-sensing pin 2 when both factors then set up in the set-up means will be eliminated by the eliminators 22, 23 and a new multiplicand will be set up in the set-up means on sensing of said next master card by the sensing device SD.

As has been mentioned above, when the sensing latches 36 are rendered inactive the sensing device SD is conditioned simultaneously to transmit to the set-up means SUM a multiplier and a multiplicand sensed from a single record card. When, however, both factors are punched in a single record card that card must also contain a control hole to be sensed by the pre-sensing pin 2 to prevent conditioning of the latch piece 10 because otherwise the link 58 will be actuated to uncouple the second from the first factor eliminator.

To provide means whereby, when no card is presented for sensing by the pre-sensing unit PU, the multiplicand already set up in the set-up means SUM shall not be cancelled therefrom until the entry of a new master card into the pre-sensing unit, there is provided a no-card sensing pin 60 which co-operates with the pre-sensing unit to determine when no card is presented to the unit. The no-card sensing pin 60 is supported by the frame 1 for movement therewith, being supported by a bracket 61 secured to the frames 1, the sensing pin being carried by a plate 62 movable lengthwise relative to the bracket 61 and sprung downwards by a spring 63. To the plate 62 is connected a link 64 the upper end of which is guided for up-and-down movement in a plate 65. The upper end of the link 64 is located beneath the out-turned portion 66 of a trip arm 67 supported on a plate 68 for swinging movement and for movement towards and away from the eliminator latch 34. The trip arm is provided with a slot 69 in which is located a pin 70 fixed to the plate 68, the pin 70 acting as the pivot about which the trip arm swings and relative to which the trip arm is movable towards and away from the eliminator latch 34. The trip arm 67 is urged towards the link 64 by a spring 71 and is moved angularly about the pin 70 by an arm 72 pivoted at 73 and connected to a link 74 carrying a cam follower, not shown, which co-operates with a cam 75 secured to a spindle 76 driven from the main shaft 31 by any suitable means, not shown. The cam 75, through link 74 and arm 72, is arranged to rock the trip arm counterclockwise, as viewed in Figures 1 and 2, so that the out-turned portion 66 on the trip arm is moved out of alignment with the link 64 illustrated in Figure 2. Accordingly, when the no-card sensing pin 60 senses the presence of a card in the pre-sensing unit, the link 64 is retained in the position shown in Figure 2 so that the trip arm 67 is engaged against the side thereof and, on upward movement of the frames 1, no lengthwise movement of the trip arm is effected by the link 64. When, however, the no-card sensing pin 60 detects the absence of a card from the pre-sensing unit the link 64 moves downwards, so that it is located beneath the out-turned portion 66, as illustrated in Figure 1, when the cam 75 permits the trip arm to return to the position shown in Figure 1 under the action of spring 71. In this position the trip arm is beneath the eliminator latch 34 and accordingly on the upward movement of the frames 1 the link 64 engages the out-turned portion 66 on the trip arm 67 and effects movement of the trip arm towards the eliminator latch 34 so that the latch 34 is raised and disengaged from the latch pin 33 thus uncoupling the second factor eliminator 23 from the first factor eliminator 22 and so rendering the second factor eliminator ineffective and ensuring that the mutliplicand set up in the set-up means SUM remains stored therein.

I claim:

1. In a calculating machine controlled by statistical record cards, apparatus for entering into the machine two factors from which a calculation is to be performed, said apparatus comprising sensing means to sense one factor from each of two card fields, set-up means including set-up members to receive and retain a factor sensed from each of said card fields, a first factor eliminator and a second factor eliminator each to eliminate one factor set-up in the set-up means, a coupling device normally coupling said eliminators for simultaneous operation, transmission means for each said card field to transmit to the set-up means factors sensed by the sensing means, a pre-sensing unit to sense a card prior to sensing thereof by said sensing means and operating under card control to permit a factor sensed from one card field to be stored in the set-up means until eliminated therefrom under control of the pre-sensing unit and to render ineffective the transmission means for said one card field while said factor remains stored in the set-up means, sensing latches rockable to render ineffective the transmission means for said one card field, a trip member rockable with the sensing latches to render the coupling device ineffective, and actuator means conditioned by said pre-sensing unit to effect rocking of the sensing latches and trip member.

2. Apparatus according to claim 1, wherein said first factor eliminator is secured to a cam operated rocking spindle to effect restoration of locking slides included in the set-up means thereby to release set-up members locked thereby in the set-up position thereof, said second eliminator is freely pivoted on the rocking spindle, and the coupling device comprises an eliminator latch pivoted on said first eliminator and co-operating with a latch pin carried by the second eliminator.

3. Apparatus according to claim 2, wherein the eliminator latch and the sensing latch are actuated by a rock shaft common thereto, said actuator means comprising a cam and a trip latch connecting the shaft and cam.

4. Appartaus according to claim 3, wherein the trip latch comprises a latch piece pivoted on a link supporting a follower co-operating with the cam, a plate connected to an arm secured to the shaft and carrying an abutment for engagement by said latch piece, and a flexible wire connecting the latch piece with said pre-sensing unit to align it for co-operation with the abutment.

5. Apparatus according to claim 4, wherein the pre-sensing unit comprises an axially movable pre-sensing pin and a rocking member connected with said flexible wire and operable by the pre-sensing pin to effect operation of the wire.

6. Apparatus according to claim 2, including a no-card sensing pin co-operating with the pre-sensing unit to determine when no card is presented for sensing by the pre-sensing unit, and interrupter means operated by the no-card sensing pin to trip said eliminator latch thereby to render ineffective the second eliminator.

7. Apparatus according to claim 3, including a no-card sensing pin co-operating with the pre-sensing unit to determine when no card is presented for sensing by the pre-sensing unit, and interrupter means operated by the no-card sensing pin to trip said eliminator latch thereby to render ineffective the second eliminator.

8. Apparatus according to claim 4, including a no-card sensing pin co-operating with the pre-sensing unit to determine when no card is presented for sensing by the pre-sensing unit, and interrupter means operated by the no-card sensing pin to trip said eliminator latch thereby to render ineffective the second eliminator.

9. Apparatus according to claim 5, including a no-card sensing pin co-operating with the pre-sensing unit to determine when no card is presented for sensing by the pre-sensing unit, and interrupter means operated by the no-card sensing pin to trip said eliminator latch thereby to render ineffective the second eliminator.

10. Apparatus according to claim 6, wherein the interrupter means comprises a trip arm supported for swinging movement and for movement towards and away from the eliminator latch, a cam operated member to effect swinging movement of the trip arm and a link operated by the no-card sensing pin to effect movement of the trip arm towards the eliminator latch to trip the latch out of latching engagement with the first eliminator.

11. Apparatus according to claim 7, wherein the interrupter means comprises a trip arm supported for swinging movement and for movement towards and away from the eliminator latch, a cam operated member to effect swinging movement of the trip arm and a link operated by the no-card sensing pin to effect movement of the trip arm towards the eliminator latch to trip the latch out of latching engagement with the first eliminator.

12. Apparatus according to claim 8, wherein the interrupter means comprises a trip arm supported for swinging movement and for movement towards and away from the eliminator latch, a cam operated member to effect swinging movement of the trip arm and a link operated by the no-card sensing pin to effect movement of the trip arm towards the eliminator latch to trip the latch out of latching engagement with the first eliminator.

13. Apparatus according to claim 9, wherein the interrupter means comprises a trip arm supported for swinging movement and for movement towards and away from the eliminator latch, a cam operated member to effect swinging movement of the trip arm and a link operated by the no-card sensing pin to effect movement of the trip arm towards the eliminator latch to trip the latch out of latching engagement with the first eliminator.

14. In a calculating machine controlled by statistical record cards, apparatus for entering into the machine two factors from which a calculation is to be performed, said apparatus comprising sensing means to sense one factor from each of two card fields, set-up means including set-up members to receive and retain a factor sensed from each of said card fields, a first factor eliminator and a second factor eliminator each to eliminate one factor set-up in the set-up means, a coupling device normally coupling said eliminators for simultaneous operation, transmission means for each said card field to transmit to the set-up means factors sensed by the sensing means, a pre-sensing unit to sense a card prior to sensing thereof by said sensing means and operating under card control to permit a factor sensed from one card field to be stored in the set-up means until eliminated therefrom under control of the pre-sensing unit and to render ineffective the transmission means for said one card field while said factor remains stored in the set-up means, disabling means to render ineffective the transmission means for said one card field, trip means operable with said disabling means to render the coupling device ineffective, and actuator means conditioned by said presensing unit to effect operation of the disabling means and trip means.

15. Apparatus according to claim 14, wherein said first factor eliminator is secured to a cam operated rocking spindle to effect restoration of locking slides included in the set-up means thereby to release set-up members locked thereby in the set-up position thereof, said second eliminator is freely pivoted on the rocking spindle, and the coupling device comprises an eliminator latch pivoted on said first eliminator and co-operating with a latch pin carried by the second eliminator.

16. Apparatus according to claim 15, including a no-card sensing pin co-operating with the pre-sensing unit to determine when no card is presented for sensing by the pre-sensing unit, and interrupter means operated by the no-card sensing pin to trip said eliminator latch thereby to render ineffective the second eliminator.

17. Apparatus according to claim 16, wherein the interrupter means comprises a trip arm supported for swinging movement and for movement towards and away from the eliminator latch, a cam operated member to effect swinging movement of the trip arm and a link operated by the no-card sensing pin to effect movement of the trip arm towards the eliminator latch to trip the latch out of latching engagement with the first eliminator.

References Cited in the file of this patent
UNITED STATES PATENTS 2,120,232   Daly _____ June 14, 1938